United States Patent
Jiang

(10) Patent No.: US 8,549,128 B2
(45) Date of Patent: Oct. 1, 2013

(54) DIGITAL MEDIA DEVICE AND METHOD FOR SHARING DATA USING THE DIGITAL MEDIA DEVICE

(75) Inventor: Wei-Wei Jiang, Shenzhen (CN)

(73) Assignees: Hong Fu Jin Precision Industry (ShenZhen), Shenzhen (CN); Hon Hai Precision Industry Co., Ltd., New Taipei (TW)

(*) Notice: Subject to any disclaimer, the term of this patent is extended or adjusted under 35 U.S.C. 154(b) by 440 days.

(21) Appl. No.: 12/902,167

(22) Filed: Oct. 12, 2010

(65) Prior Publication Data
US 2012/0030328 A1 Feb. 2, 2012

(30) Foreign Application Priority Data
Jul. 29, 2010 (CN) .......................... 2010 1 0240231

(51) Int. Cl.
G06F 15/173 (2006.01)
(52) U.S. Cl.
USPC ........... 709/223; 709/209; 709/224; 709/225; 709/226; 713/300; 713/310; 370/254
(58) Field of Classification Search
USPC ................. 709/223–226, 209; 713/300, 310; 370/254
See application file for complete search history.

(56) References Cited

U.S. PATENT DOCUMENTS

| 8,086,879 B2 * | 12/2011 | Hady ............................ 713/310 |
| 2006/0067357 A1 * | 3/2006 | Rader ........................... 370/463 |
| 2006/0075269 A1 * | 4/2006 | Liong et al. ................... 713/300 |
| 2006/0199621 A1 * | 9/2006 | Stirbu et al. ................... 455/574 |
| 2007/0283174 A1 * | 12/2007 | Okazaki ....................... 713/300 |
| 2008/0197968 A1 * | 8/2008 | Schmidt ........................ 340/5.2 |
| 2009/0161579 A1 * | 6/2009 | Saaranen et al. .............. 370/254 |
| 2010/0083327 A1 * | 4/2010 | Toba et al. .................... 725/109 |
| 2012/0190390 A1 * | 7/2012 | Reunamaki et al. .......... 455/500 |

* cited by examiner

*Primary Examiner* — Andrew L Nalven
*Assistant Examiner* — Amir Mehrmanesh
(74) *Attorney, Agent, or Firm* — Altis & Wispro Law Group, Inc.

(57) ABSTRACT

A digital media device and a method for sharing data include a source device sending a search request to search digital media devices under a power-on status, and sending a control command to a middle device from the found digital media devices, to control the middle device to search at least one target device under a power-off status. The data sharing method further includes sending a power-on command to the middle device to power on the target device. The data sharing method further includes sharing data with the target device when the target device powering on successfully and supporting DLNA network.

16 Claims, 3 Drawing Sheets

DIGITAL MEDIA DEVICE AND METHOD FOR SHARING DATA USING THE DIGITAL MEDIA DEVICE

BACKGROUND

1. Technical Field

Embodiments of the present disclosure relate to data sharing technology, and in particular, to a digital media device and method for sharing data using the digital media device.

2. Description of Related Art

Digital Living Network Alliance (DLNA) is an organization that provides a standard for ensuring compatible sharing of data (e.g. images, video, and audio) among different digital media devices, such as TVs and digital cameras, for example. However, if some digital media devices (e.g. digital media server or digital media players) in a network of DLNA compliant devices are powered-off, data of those digital media devices cannot be shared or accessed.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage system.

Figure 1:
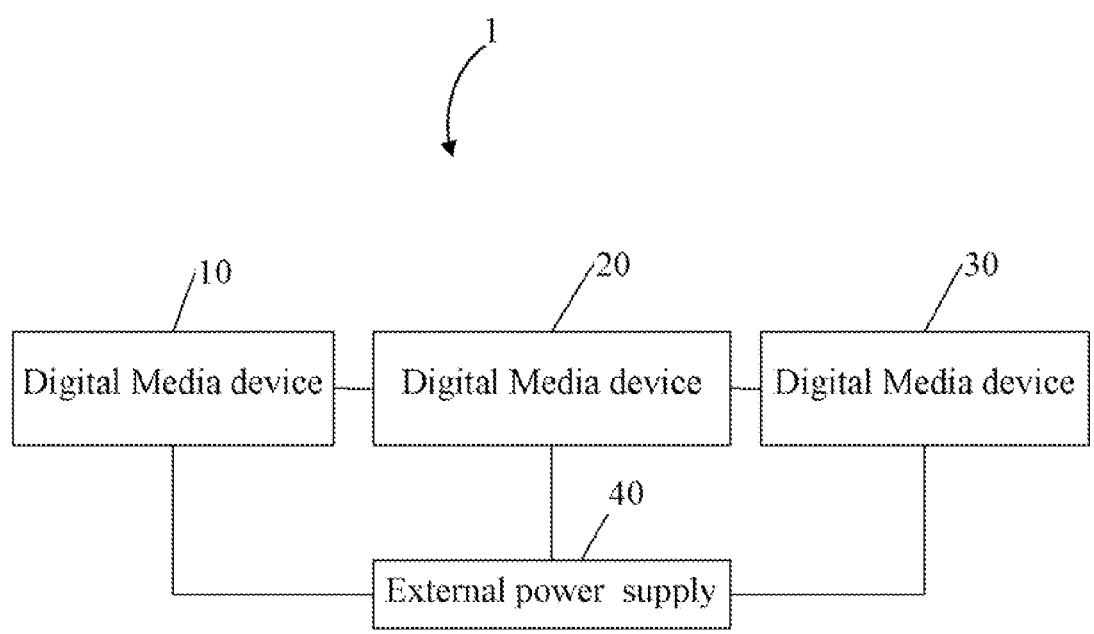
FIG. 1 is a block diagram of one embodiment of a plurality of digital media devices.

FIG. 1 is a block diagram of one embodiment of a plurality of digital media devices 10, 20, 30 in a Digital Living Network Alliance (DLNA) compliant network 1 (DLNA network 1 for simplification). In some embodiments, the digital media devices 10, 20, 30 may turn on (a power-on status) other digital media devices in the DLNA network 1 that are on an off state (a power-off status), in order to share data (e.g. images, video, and audio) with the other digital media devices. The digital media devices 10, 20, 30 may be digital media servers (DMSs), digital media players (DMPs), digital media controllers (DMCs), or other DLNA compliant digital media devices, for example. The plurality of digital media devices 10, 20, and 30 connect to an external power supply 40.

The digital media devices 10, 20, and 30 may be in hard-wired communication with each other or communicate wirelessly. For describing the embodiment clearly, it is assumed that the digital media devices 10 and 20 are turned on, and the digital media device 30 are initially turned off. Detailed descriptions are provided below.

Figure 2:
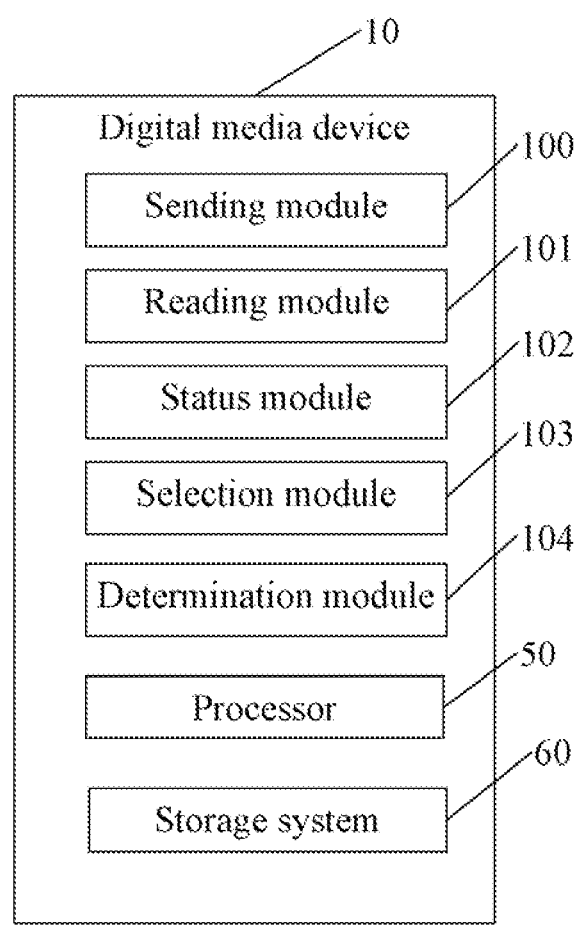
FIG. 2 is a block diagram of one embodiment of one digital media device of FIG. 1.
Figure 3:
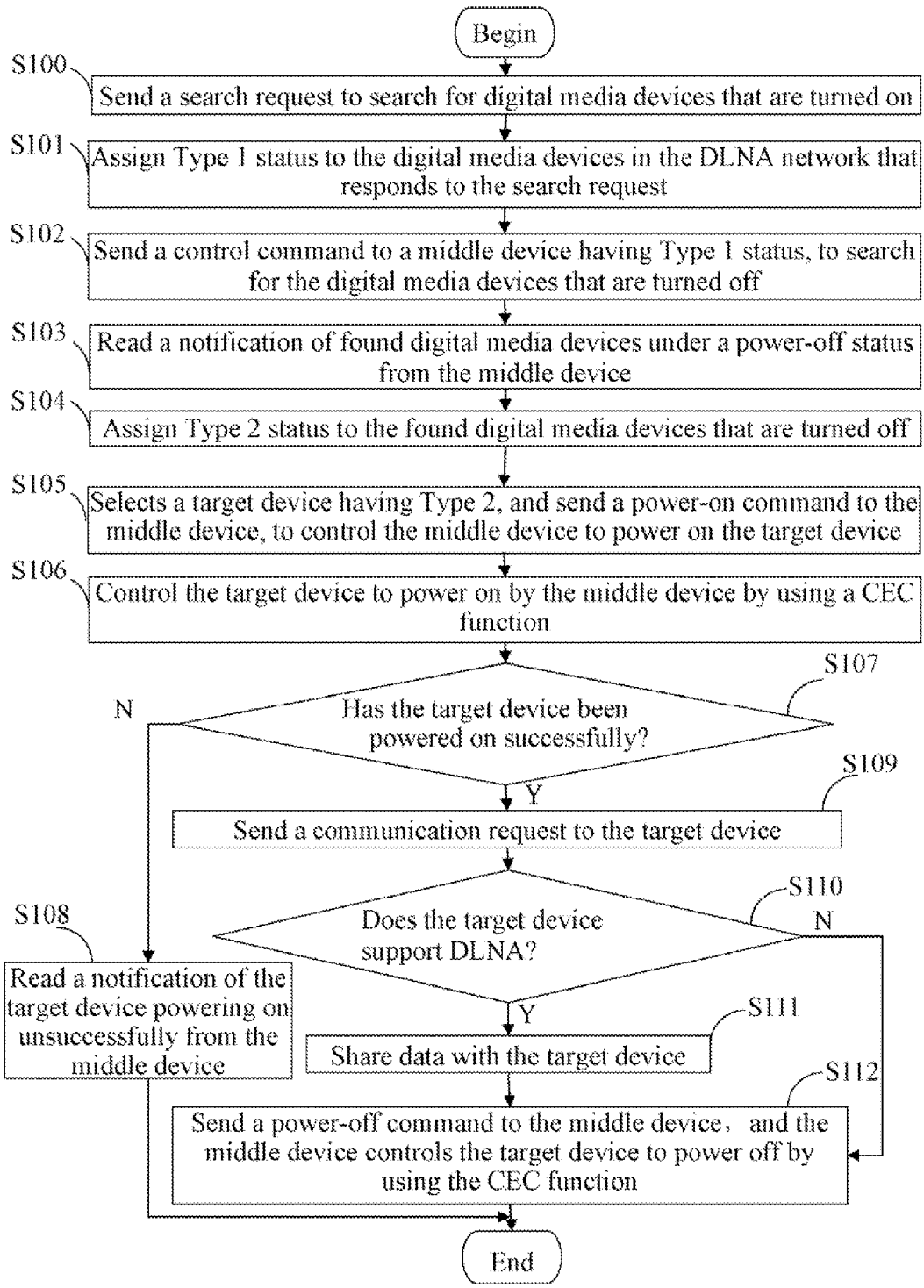
FIG. 3 is a flowchart of one embodiment of a method for sharing data using the digital media device of FIG. 1.

FIG. 2 is a block diagram of one embodiment of the digital media device 10 of FIG. 1. In some embodiments, the digital media device 10 includes a sending module 100, a reading module 101, a status module 102, a selection module 103, and a determination module 104. The digital media device 10 further includes a processor 50 and a storage system 60. The processor 50 executes one or more computerized codes of the digital media device 10 and other applications, to provide the functions of the digital media device 10. The storage system 60 may be a memory system of the digital media device 10. The modules 100-104 may comprise computerized code in the form of one or more programs that are stored in the storage system 60. The computerized code includes instructions that are executed by the at least one processor 50 to provide functions for modules 100-104.

For simplification, the digital media device 10, is turned on and considered as a source device 10. The source device represents the digital media device that sends search request and a control command to control other digital media devices to power on or power off. An exemplary source device 10 should include the modules 100-104 as mentioned above. The digital media device 20 is considered as a middle device 20, and the digital media device 30 is considered as a target device 30. The middle device 20 represents the digital media device that can receive the search request and control other digital media devices to power on or power off according to the control command from the source device. The target device 30 represents the digital media device that is controlled to be powered on or powered off by the middle device 20. In some embodiments, the source device 10 may communicate with a middle device 20, control the target device 30, through the middle device 20, and share data with the target device 30. Detailed descriptions are provided below.

The sending module 100 sends a search request to search for one or more digital media devices that are turned on in the DLNA network 1. The search request may be in the form of a known command type such as a "Type 1 device discovery" command, for example.

The reading module 101 checks for responses from digital media devices in the DLNA network 1.

The status module 102 assigns "Type 1" status to any digital media device in the DLNA network 1 that responds to the search request. In some embodiments, the status of "Type 1" represents that the digital media device is currently powered on.

The selection module 103 selects one of the digital media device having "Type 1" status that supports a consumer electronic control (CEC) function as being the middle device 20, such as the digital media device 20, for example. The CEC function represents a controlling function between different electronic devices connected through a High Definition Multimedia Interface (HDMI) to prompt interoperability and functions of the electronic devices. For example, the CEC function uses a CEC signal to power on or power off the electronic devices connected through the HDMI. In other embodiments, the selection module 103 may select any other digital media device in the DLNA network 1 that supports the CEC function from the digital media devices marked with Type 1.

The sending module 100 further sends a control command to the middle device 20 (e.g., the digital media device 20), to search for the digital media devices that are turned off in the DLNA network 1. For example, the control command may be "Type 2 device discovery" command. The middle device 20 searches for the digital media devices that are turned off but connected to the middle device 20 through HDMI by using the CEC function. The middle device 20 sends a notification of found digital media devices that are turned off to the source device 10.

The status module 102 further assigns "Type 2" status to the found digital media devices that are turned off in the DLNA network 1.

The selection module 103 further selects one of digital media device having "Type 2" status as being the target device 30. The middle device 20 connects to the target device 30 through HDMI. Both the middle device 20 and the target device 30 include CEC modules. When the CEC modules are electrified and working normally, even if the target device 30 (e.g. the digital device 30) is under the power-off status, the target device 30 also can receive the CEC signal. In other embodiments, the selection module 103 may select any other digital media device from the digital media devices marked with "Type 2".

The sending module 100 further sends a power-on command to the middle device 20, to control the middle device 20 to power on the target device 30. The middle device 20 controls the target device 30 to power on using the CEC function. For example, the middle device 20 sends a power on CEC signal to the target device 30 to power on the target device 30. The middle device 20 further determines whether the target device 30 has been powered on successfully, and sends a successful notification or a failed notification.

In some embodiments, if the target device 30 sends an unsuccessful power-on message to the middle device 20 by using the CEC function, the middle device 20 determines that the target device 30 has been powered on unsuccessfully, and sends a failed notification to the source device. If the target device 30 sends a successful power-on message to the middle device 20 by using the CEC function, the middle device 20 determines that the target device 30 has been powered on successfully, and sends a failed notification to the source device.

The reading module 101 reads the failed notification from the middle device 20.

In response to read the successful notification, the sending module 100 sends a communication request, such as a "device discovery" request, to the target device 30.

The determination module 104 determines whether the target device 30 supports the DLNA network 1. If the target device 30 supports the DLNA network 1, the target device 30 may communicate with the digital media device 10 through wire or wireless. In some embodiments, if the reading module 101 receives the communication response from the target device 30, the determination module 104 determines that the target device 30 supports the DLNA network 1. If the reading module 101 does not receive any communication response from the target device 30, the determination module 104 determines that the target device 30 does not support the DLNA network 1.

In response that the target device 30 supports the DLNA network 1, the reading module 101 shares data of the source device with the target device 30.

In response that the target device 30 does not support the DLNA network 1, the sending module 100 sends a power-off command to the middle device 20, to control the middle device 20 to power off the target device 30. The middle device 20 controls the target device 30 to power off by using the CEC function.

FIG. 4 is a flowchart of one embodiment of a method for sharing data using the digital media device of FIG. 1. Depending on the embodiment, additional blocks may be added, others removed, and the ordering of the blocks may be changed.

In block S100, the sending module 100 sends a search request to search for one or more digital media devices that are turned on in the DLNA network 1.

In block S101, the reading module 101 checks for responses from the digital media devices in the DLNA network 1, and the status module 102 assigns "Type 1" status to the digital media devices in the DLNA network 1 that responds to the search request.

In block S102, the selection module 103 selects one of the digital media devices having "Type 1" status that supports the CEC function as being the middle device 20, and the sending module 100 further sends a control command to middle device 20, to search for the digital media devices that are turned off in the DLNA network 1.

In block S103, the middle device 20 searches for the digital media devices that are turned off but connected to the middle device 20 through HDMI by using the CEC function, and sends a notification of found digital media devices under the power-off status to the source device 10.

In block S104, the status module 102 assigns "Type 2" status to the found digital media devices that are turned off in the DLNA network 1.

In block S105, the selection module 103 selects one of the digital media devices marked having "Type 2" status as being the target device 30, and the sending module 100 sends a power-on command to the middle device 20, to control the middle device 20 to power on the target device 30.

In block S106, the middle device 20 controls the target device 30 to power on by using the CEC function, and receives a message of whether the target device 30 powering on successfully from the target device 30.

In block S107, the middle device 20 determines whether the target device 30 has been powered on successfully. If the target device 30 sends an unsuccessful power-on message to the middle device 20 through CEC function, the middle device 20 determines that the target device 30 has been powered on unsuccessfully, the procedure turns to block S108. If the target device 30 sends a successful power-on message to the middle device 20 through CEC function, the middle device 20 determines that the target device 30 has been powered on successfully, the procedure turns to block S109.

In block S108, the reading module 101 reads a failed notification from the middle device 20, the procedure is end.

In block S109, the reading module 101 reads a successful notification from the middle device 20, and the sending module 100 sends a communication request to the target device 30.

The determination module 104 determines whether the target device 30 supports the DLNA network 1 by whether receiving a communication response of the target 30. In some embodiments, if the reading module 101 receives the communication response of the target device 30, the determination module 104 determines that the target device 30 supports DLNA network 1. If the reading module 101 does not receive the communication response of the target device 30, the determination module 104 determines that the target device 30 does not support the DLNA network 1.

If the target device 30 supports the DLNA network 1, in block S111, the reading module 101 shares data of the source device with the target device 30.

If the target device 30 does not support the DLNA network 1, in block S112, the sending module 100 sends a power-off command to the middle device 20, to control the middle device 20 to power off the target device 30. The middle 20 controls the target device 30 powering off by using the CEC function.

It should be emphasized that the described inventive embodiments are merely possible examples of implementations, and set forth for a clear understanding of the principles of the present disclosure. Many variations and modifications may be made to the-described inventive embodiments without departing substantially from the spirit and principles of the present disclosure. All such modifications and variations are intended to be comprised herein within the scope of this disclosure and the-described inventive embodiments, and the present disclosure is protected by the following claims.

What is claimed is:

1. A computer-implemented method for sharing data in a Digital Living Network Alliance (DLNA) network, the DLNA network comprising a plurality of digital media devices in electronic communication, the method comprising:

Confirming a digital media device under a power-on status from the plurality of digital media devices as being a source device, sending a search request from the source device to search for one or more digital media devices under the power-on status;

assigning each of found digital media devices under the power-on status a first status, and selecting only one of the found digital media devices having the first status as a middle device;

sending a control command from the source device to the middle device, to control the middle device to search at least one of digital media devices under a power-off status;

assigning each of found digital media devices under the power-off status a second status and selecting one of the found digital media devices having the second status as a target device;

sending a power-on command from the source device to the middle device, to control the middle device to power on the target device;

sending a communication request from the source device to the target device under the condition that the target device has been powered on successfully; and in response to receive a communication response from the target device, sharing data of the source device with the target device.

2. The method as claimed in claim 1, wherein under the condition that the target device sends a successful power-on message to the middle device, the middle device sends a successful notification to the source device, to notify that the target device has been powered on successfully.

3. The method as claimed in claim 1, wherein under the condition that the target device sends an unsuccessful power-on message to the middle device, the middle device sends a failed notification to the source device to notify that the target device has been powered on unsuccessfully.

4. The method as claimed in claim 1, further comprising: sending a power-off command from the source device to the middle device, to control the middle device to power off the target device.

5. The method as claimed in claim 1, wherein the middle device and the target device both support a consumer electronic control (CEC) function, and the middle device controls the target device to power on or power off by using the CEC function.

6. A non-transitory computer readable storage medium storing a set of instructions, the set of instructions capable of executed by a processor to perform a method for sharing data in a Digital Living Network Alliance (DLNA network), the DLNA network comprising a plurality of digital media devices in electronic communication, the method comprising:

confirming a digital media device under a power-on status from the plurality of digital media devices as being a source device, sending a search request from the source device to search for one or more digital media devices under the power-on status;

assigning each of found digital media devices under the power-on status a first status, and selecting only one of the found digital media devices under the power on status having the first status as a middle device;

sending a control command from the source device to the middle device, to control the middle device to search at least one of digital media devices under a power-off status;

assigning each of found digital media devices under the power-off status a second status and selecting one of the found digital media devices having the second status as a target device;

sending a power-on command from the source device to the middle device, to control the middle device to power on the target device;

sending a communication request from the source device to the target device under the condition that the target device has been powered on successfully; and in response to receive a communication response from the target device, sharing data of the source device with the target device.

7. The non-transitory computer readable storage medium as claimed in claim 6, wherein under the condition that the target device sends a successful power-on message to the middle device, the middle device sends the successful notification to the source device, to notify that the target device has been powered on successfully.

8. The non-transitory computer readable storage medium as claimed in claim 7, wherein under the condition that the target device sends an unsuccessful power-on message to the middle device, the middle device sends the failed notification to the source device, to notify that the target device has been powered on unsuccessfully.

9. The non-transitory computer readable storage medium as claimed in claim 6, wherein the method further comprises:

sending a power-off command from the source device to the middle device, to control the middle device to power off the target device.

10. The non-transitory computer readable storage medium as claimed in claim 6, wherein the middle device and the target device both support a consumer electronic control (CEC) function, and the middle device controls the target device to power on or power off by using the CEC function.

11. A digital media device (DMC) in a Digital Living Network Alliance (DLNA network) and under a power-on status, the DLNA network further comprising a plurality of digital media devices in electronic communication, comprising:

a storage system;

at least one processor; and one or more programs stored in the storage system, executable by the at least one processor, the one or more programs comprising:

a sending module that sends a search request to search for one or more digital media devices under the power-on status;

a reading module that receives one or more responses from the found digital media devices;

a status module that assigns each of the found digital media devices under the power-on status a first status;

a selection module that selects only one of the found digital media devices having the first status as a middle device, the sending module further sends a control command to the middle device, to control the middle device to search at least one of digital media devices under a power-off status;

the status module further assigns each of the found digital media devices under the power-off status a second status and selecting one of the found digital media devices having the second status as a target device;

the sending module further sends a power-on command to the middle device, to control the middle device to power on the target device, in response to receiving a search result from the middle device;

the sending module further sends a communication request to the target device, under the condition that the target device has been powered on successfully; and a reading module that shares data of the source device with the target device, in response to receive a communication response from the target device.

12. The digital media device as claimed in claim 11, wherein the one or more programs further comprising:

a determination module that determines whether the target device is powered on successfully or unsuccessfully, according to whether receiving a successful notification or a failed notification from the middle device.

13. The digital media device as claimed in claim 12, wherein under the condition that the target device sends a successful power-on message to the middle device, the reading module further receives the successful notification from the middle device.

14. The digital media device as claimed in claim 12, wherein under the condition that the target device sends an unsuccessful power-on message to the middle device, the reading module operable to receive the failed notification from the middle device.

15. The digital media device as claimed in claim 11, wherein the sending module further sends a power-off command to the middle device, to control the middle device to power off the target device.

16. The digital media device as claimed in claim 11, wherein the middle device and the target device both support a consumer electronic control (CEC) function, and the middle device controls the target device to power on or power off by using the CEC function.

* * * * *